Nov. 22, 1938.   R. S. SANFORD ET AL   2,137,249
VEHICLE TRANSMISSION
Original Filed Feb. 6, 1932   5 Sheets-Sheet 3

INVENTOR.
ROY S. SANFORD
MONTGOMERY W. McCONKEY
BY H. O. Clayton
ATTORNEY ov. 22, 1938.    R. S. SANFORD ET AL    2,137,249
VEHICLE TRANSMISSION
Original Filed Feb. 6, 1932    5 Sheets-Sheet 4

INVENTOR.
ROY S. SANFORD
MONTGOMERY W. McCONKEY
BY
H. O. Clayton
ATTORNEY

Nov. 22, 1938.   R. S. SANFORD ET AL   2,137,249
VEHICLE TRANSMISSION
Original Filed Feb. 6, 1932   5 Sheets-Sheet 5

INVENTOR.
ROY S. SANFORD
MONTGOMERY W. McCONKEY
BY H. O. Clayton
ATTORNEY

Patented Nov. 22, 1938

2,137,249

UNITED STATES PATENT OFFICE 2,137,249

VEHICLE TRANSMISSION

Roy S. Sanford, New York, N. Y., and Montgomery W. McConkey, South Bend, Ind., assignors to Bendix Aviation Corporation, South Bend, Ind., a corporation of Delaware Original application February 6, 1932, Serial No. 591,427. Divided and this application August 14, 1935, Serial No. 36,110

1 Claim. (Cl. 74—389.5)

This invention, which is a division of application No. 591,427, filed February 6, 1932, relates to vehicles, such as automobiles, and is illustrated as embodied in the chassis of a passenger car, the particular chassis shown having individually sprung wheels and novel power transmitting mechanism between the engine and the drive wheels.

An important object of the invention is to increase the efficiency and effectivenss of the power transmitting mechanism, and to this end the same is made up as a unit, preferably supported on the chassis frame, said unit including both speed-change and differential gearing, and thus constituting the equivalent of the conventional automotive transmission and differential units. A conventional clutch is also incorporated in the power transmission, both the clutch and aforementioned gearing being preferably power operated by driver controlled pressure differential operated vacuum motors. The several coupling elements of the power transmission as a whole, and their vacuum operation, are claimed in the aforementioned parent application and also in divisional applications No. 749,358, filed October 22, 1934, and No. 752,240, filed November 9, 1934, the instant application being limited to the construction of the combined transmission and differential unit compactly mounted at the rear of the vehicle and, by virtue of the individual springing of each wheel, constituting a part of the sprung weight of the vehicle.

A feature of the invention, therefore, lies in the provision of such a power transmission unit, the particular novelty of which lies in the combination of a forward and reverse gear unit, a so-called two-speed rear axle unit drivably coupled therewith, and a locking differential mechanism directly coupled with said two-speed unit.

Other features of the invention, including types of vacuum power units for operating the two-speed rear axle unit, and other novel and desirable structures and features will be apparent from the following description of the illustrated embodiments shown in the accompanying drawings, in which.

Figure 1:
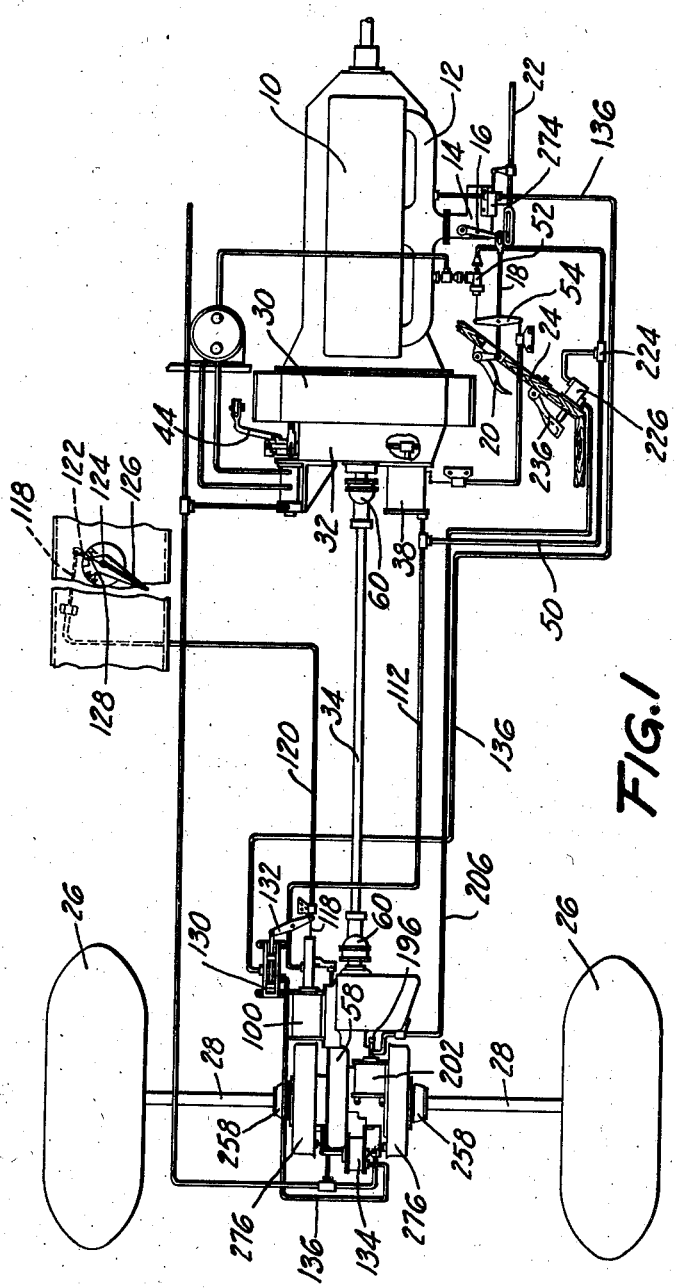
Figure 1 is a diagrammatic assembly view, mostly in plan but partly in vertical section through the floorboard and the instrument board to show some of the controls, of an automobile chassis embodying our invention.

The vehicle selected for illustration is an automobile chassis including an internal-combustion engine 10 having the usual intake manifold 12 and carburetor 14, with the passage from the carburetor to the manifold controlled by the usual throttle valve having an operating arm 16. The throttle arm 16 is connected, by means such as a lengthwise-movable rod 18, with an accelerator pedal or the like 20, and is ordinarily also independently operable through a second lost motion connection 22, for example by the usual hand throttle lever on the steering column. The accelerator pedal 20 or its equivalent is pivotally mounted on the floorboard 24, for manipulation by the toe of the driver's right foot. The rod 18 has a lost motion connection with the throtttle arm 16, so that it may have a short additional motion (for manipulating the clutch control valve described below) after the throttle is closed.

The engine is arranged to drive the vehicle by driving road wheels 26 through axle shafts 28. While not necessarily so limited, the invention is especially applicable to an arrangement in which there is no axle carrying the wheels 26, instead of which the wheels are individually sprung with suitable universal joints at both ends of both the axle shafts 28.

The present invention has mainly to do with the power transmitting mechanism through which the engine 10 drives the axle shafts 28 or their equivalents.

Figure 8:
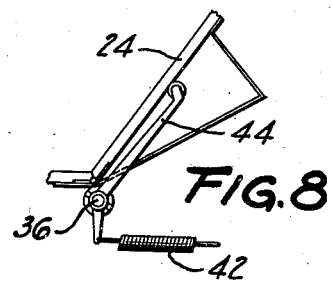
Figure 8 is a vertical section through the floorboard showing a part of the floorboard depressible to throw out the clutch.
Figure 7:
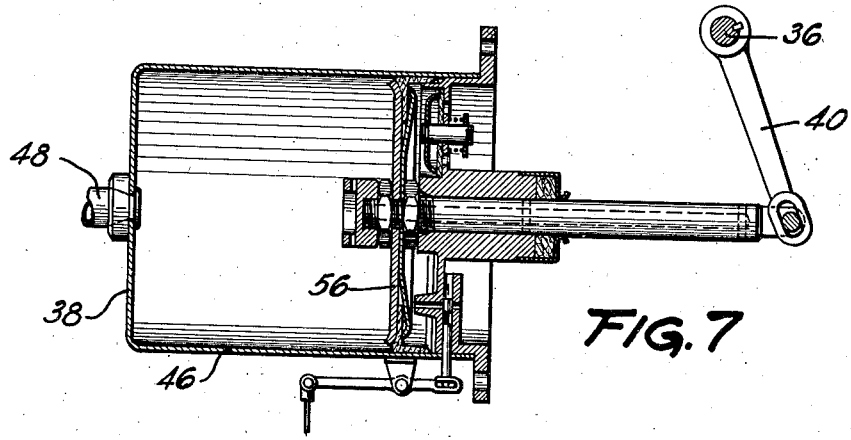
Figure 7 is a section, substantially horizontal, through the clutch control power unit shown in top plan in Figure 1.
Figures 10, 11:
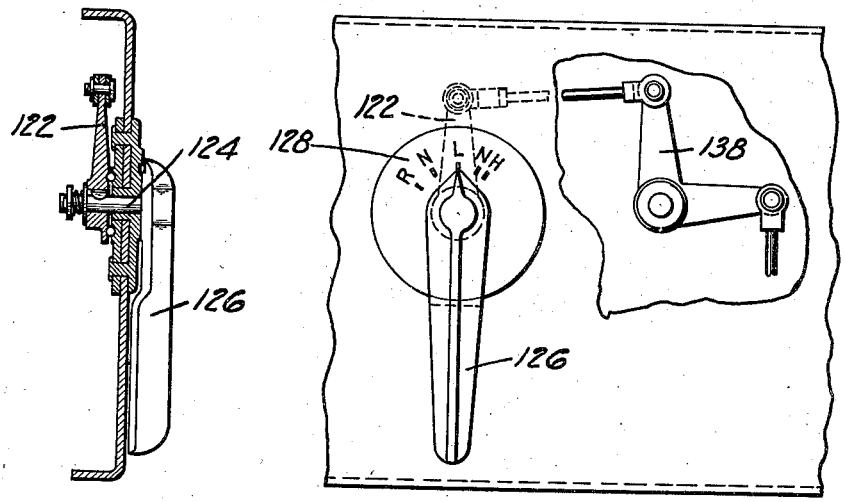
Figures 10 and 11 are respectively a front elevation and a vertical section, showing on a larger scale than Figure 9 the control for the low-reverse gear shift.

Immediately behind the engine flywheel and its housing 30 is arranged a clutch of any desired character, in a clutch housing 32, through which clutch the engine drives a propeller shaft 34. The clutch is operated, against the resistance of the usual clutch springs (not shown), by a clutch shaft or the like 36 (Figures 7 and 8) normally operated by a power device 38 acting on an arm 40 secured on the clutch shaft. Spring 42 holds the manual lever 44 in the normal position shown.

The cylinder 46 is connected, through a fitting 48, with the intake manifold 12 by means of a conduit 50 controlled by a valve 52 operatively connected to the crossbar 54 so that the piston 56 is automatically sucked rearwardly to disengage the clutch whenever the accelerator pedal 20 is fully or completely released. The valve 52 may be substantially as more fully described and as claimed in application No. 568,082, filed October 10, 1931, by Victor W. Kliesrath, and does not in itself form any part of the invention of the present application, and will therefore not be further described. It will be seen that the clutch is automatically disengaged whenever the accelerator pedal is released, and is reengaged by depressing the accelerator pedal, the speed of reengagement being controlled according to the engine speed.

Figure 2:
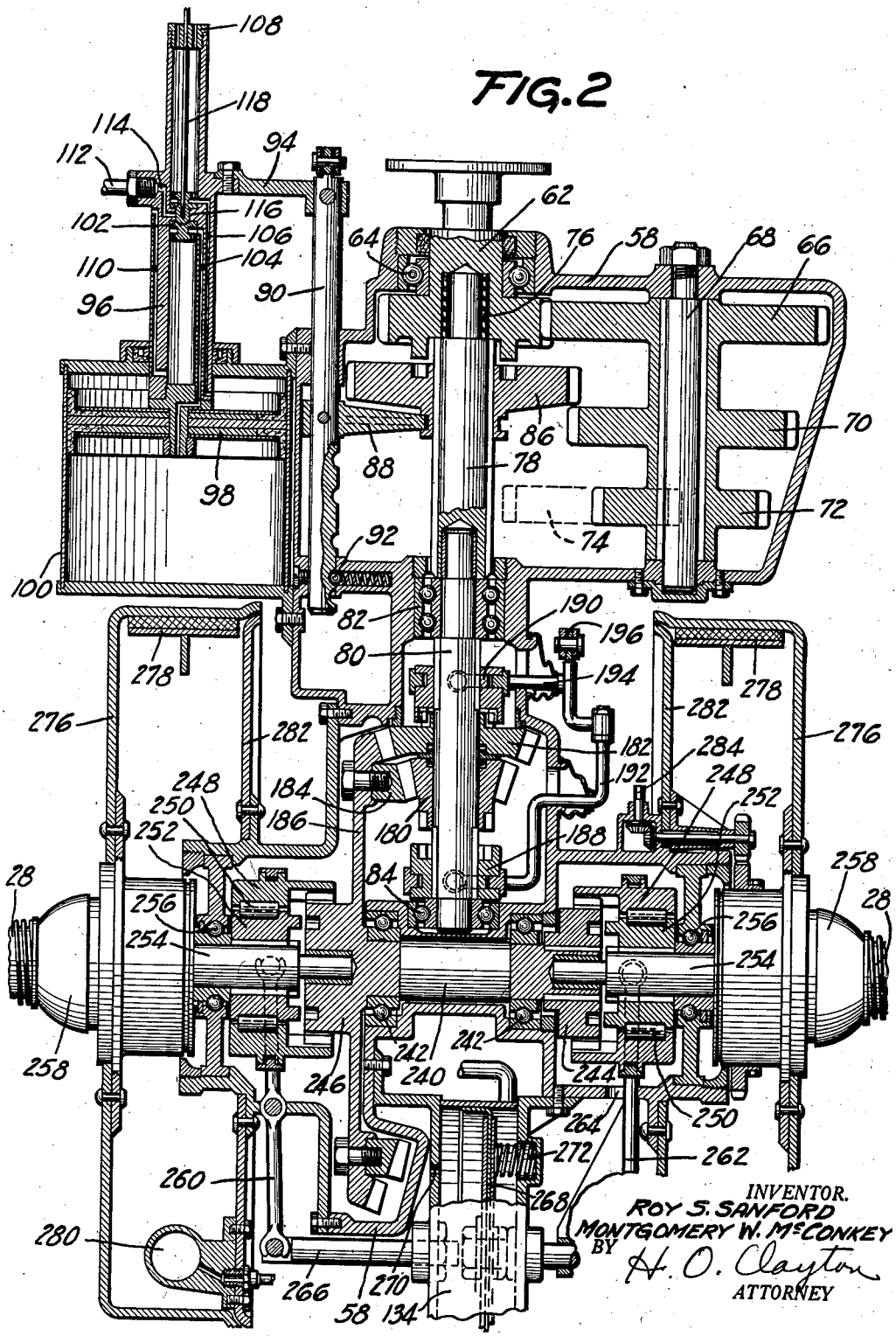
Figure 2 is a horizontal section through the novel transmission-differential unit shown in plan in Figure 1.

The propeller shaft 34 drives the rear axle shafts 28 through a novel unit, preferably supported on the chassis frame and shown in top plan in Figure 1 and in horizontal section in Figure 2, and which in the particular embodiment shown in these figures includes the following principal parts: (1) a low-speed, direct-drive, reverse, change-speed gearing with a novel vacuum power operator, (2) a high-second gear shift independent of (1) and also provided with a vacuum power operator, (3) a differential or its equivalent, being shown as one form of what is usually called a "locking differential", (4) a free-wheel drive to each shaft 28, (5) a lockout, preferably power-operated, for the free-wheel drives, and (6) a pair of hydraulic or other brakes acting on the wheels 26 through the axle shafts 28. The above parts are all carried by, and are mostly housed within, a housing or gear-box 58 formed in suitable sections bolted together.

The propeller shaft 34 (which may if desired have universal joints 60 at its forward and rear ends) drives a short shaft 62 journaled in a bearing 64 carried by the gear-box 58, and formed at its rear end (inside the gear-box) as a small pinion meshing with and driving a large gear 66 forming part of a three-gear cluster rotatably mounted on a fixed countershaft 68. The gear cluster also includes a medium sized gear 70 and a small gear 72, the last-named gear meshing with a reverse idler gear 74 (carried by a removable cap above or below the plane of Figure 2, and therefore indicated in dotted lines).

Piloted in the rear end of shaft 68, in the roller bearing 76, is the forward end of a driven shaft 78 splined or keyed at its rear end to an aligned pinion shaft 80 journaled in bearings 82 and 84 carried by the gear-box 58. Splined on the driven shaft 78 is a movable driven gear 86 slidable, by a suitable shifter fork 88 from the neutral position shown in Figure 2, rearwardly to mesh with gear 70 or reverse gear 74, or forwardly to bring clutch portions on its forward face into interengagement with corresponding clutch portions on the rear face of the pinion and shaft 62 to give direct drive (this last being the normal position of gear 86).

The shifter fork 88 or its equivalent is carried by means such as a lengthwise-slidable shifter rod 90 having a series of notches interlocking with a spring-pressed ball 92 to give the following positions, in order from the lower (rear) end of the rod: (1) direct drive, (2) neutral, (3) low gear (in mesh with gear 70), (4) neutral, and (5) reverse (in mesh with gear 74).

The shifter rod 90 is shown rigidly secured, by a crossbar or the like 94, to a piston rod 96 carried by a double-acting piston 98 in a power cylinder 100 mounted on the gear-box 58. The piston rod 96 is hollow, and contains a slide valve 102 controlling a passage 104 opening through the piston 98 into the space below (behind) the piston, and a passage 106 opening above (ahead of) the piston.

The upper end of the hollow piston rod communicates with the atmosphere through openings in a plug 108 threaded into the end of the piston rod, and the lower end of the hollow piston rod communicates with the atmosphere through a passage 110 which opens outside the power cylinder in all positions of the piston. A flexible vacuum connection 112 opens inside the hollow piston rod through a passage 114 opening through an internal collar 116 substantially midway of the piston rod, and which passage is controlled by the slide valve 102.

The valve 102 is of the follow-up type, and includes three disconnected parts; viz., upper and lower valve slides, each having an annular external groove and passages therefrom leading out through the end of the slide away from the collar 116, and a central operating button with rounded ends fitting into seats in the adjacent faces of the valve slides, and which is of a size to pass easily through the collar 116, and which is carried by and secured to the end of a relatively stiff Bowden wire 118 passing through plug 108.

In the operation of the power device just described, the valve 102 can be pre-set for any gear position desired, before suction is applied through conduit 112. If the wire 118 and button on its end are pushed downwardly (i. e. rearwardly), the lower slide valve will be pushed down to a corresponding position. This connects the vacuum conduit 112 through passage 30 with the space below (behind) the piston 98, leaving the space above (in front of) the piston connected to the atmosphere. Or if the wire is pulled upwardly (forwardly) instead, the upper valve slide is pulled in a corresponding direction, connecting the vacuum conduit 112 through passage 106 with the space above (in front of) the piston 98, leaving the space below (behind) the piston connected to the atmosphere.

When now the vacuum is applied through conduit 112, the piston 98 follows the valve until the latter regains the position of parts shown in Figure 2, thereby shifting the gears to the position for which the valve 102 was pre-set.

The Bowden wire 118 is shown passing through a Bowden conduit 120, and as being connected at its forward end to a device such as an arm 122 keyed to a shaft 124 connected to a preselector handle 126. The handle 126 is formed with a pointer passing over a scale 128 indicating the different gear positions.

A valve 130 is also connected to Bowden wire 118 through the medium of a transfer lever 132 and operates to admit atmosphere to the cylinder 134 through the rearward portion of conduit 136, when the selector handle 126 is moved into reverse position, thus providing positive drive in reverse speed.

The conduit 112, as shown in Figure 1, is connected to the clutch control vacuum conduit 50, so that the selected shift of the gears is made by releasing the accelerator pedal, which at the same time throws out the clutch. The gear shift and the clutch control are therefore interlocked, and it is impossible to shift the gears accidentally when the clutch is engaged.

In the arrangement of Figures 6, 9, 10 and 11, an arrangement is shown for operating the gear shift directly from the handle 126 without preselection and, if desired, without an interlock with the clutch control, but with provision for manual shifting if the power fails.

In this arrangement, the handle 126 is connected through a linkage 138 with the front portion 140 of a two-part piston rod. Portion 140 telescopes into an outer portion 142 to which the crossbar 94 and therefore the shifter rod 90 are connected.

A vacuum connection 144, corresponding to connection 112, and which is connected to conduit 50 if an interlock with the clutch control is desired and directly to the manifold 12 if no interlock is desired, is secured to piston rod portion 140 in communication with a vacuum passage 146 opening outwardly through a collar 148 near the lower (rear) end of the piston rod.

An air passage 150 runs from a groove 152 in the piston rod and opens through its lower (rear) end. Air passages 154 are provided between the telescoping piston rod sections 140 and 142, for example by making the latter a loose fit about the former, and an opening 156 provides communication between these air passages and groove 152.

The outer piston rod section 142 is secured at its lower (rear) end to a valve chamber 158 carrying a double-acting power piston 160 corresponding to piston 98. The valve chamber is formed with four conical seats for valves 162, 164, 166, and 168 sleeved on the inner piston rod section 140, with a valve spring 170 compressed between valves 162 and 164 and a valve spring 172 compressed between valves 166 and 168. The collar 148 is arranged between the valves 164 and 166 and has a short lost motion before engaging either of them. The valve chamber is formed with ports 174 from the space between valves 162 and 164 to the space below (behind) the piston and with ports 176 from the space between valves 166 and 168 to the space above (in front of) the piston. A cup-shaped cap 178 forms a chamber over the lower end of the valve chamber 158.

In operation, with the parts as shown, the vacuum connection is sealed off by the valves 164 and 166, which are held against their seats by springs 170 and 172. The space above (in front of) the piston communicates with the atmosphere through ports 176, past the open valve 168, and through passages 154. The space below (behind) the piston communicates with the atmosphere through ports 174, past the open valve 162, through passage 150, groove 152, port 156, and passages 154.

Figure 6:
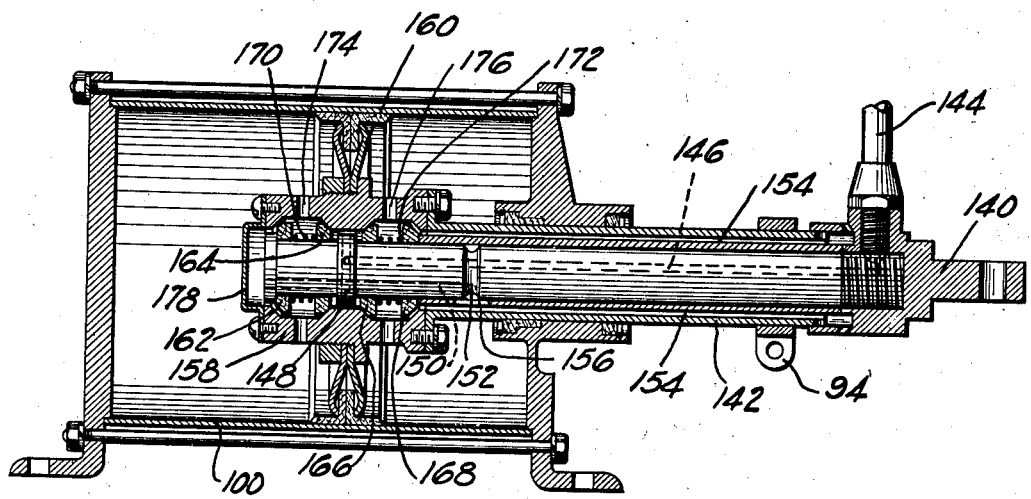
Figure 6 is a section through a modified form of the gear shift power unit.
Figure 9:
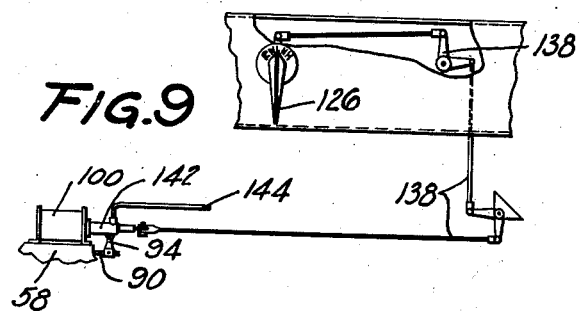
Figure 9 is a diagram showing the control of a power unit such as the one shown in Figure 6.

If now tension is applied to connections 138, part 140 shifts upward (forward), first closing valve 168 and then (by contact with collar 148) opening valve 166, thereby opening communication between the vacuum passage 146 and the space above (ahead of) the piston. The piston then follows up until the positions shown in Figure 6 are regained. The reverse action takes place if connections 138 are manipulated to push piston rod 140 downward (rearward). In case of failure of the power, after a short lost motion, the above-described connections shift the gears manually.

Figure 4:
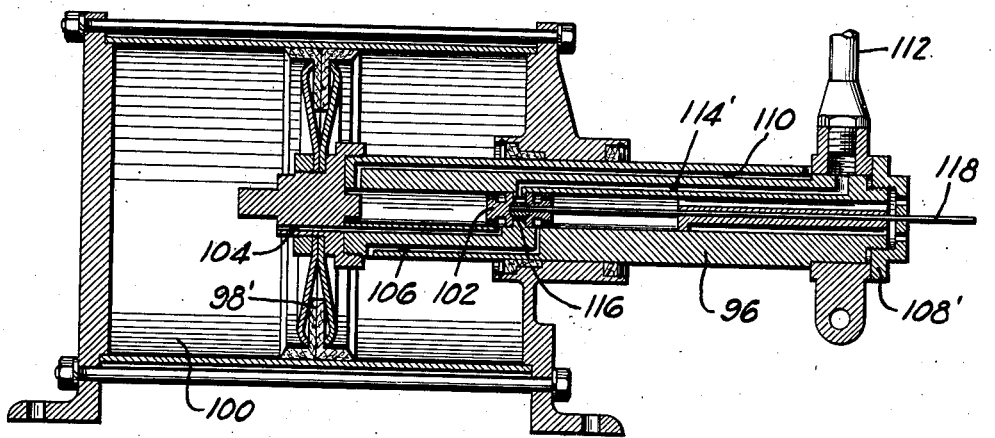
Figure 4 is a horizontal section, corresponding to the upper left-hand portion of Figure 2, of a modified form of power unit for the low-reverse gear shift.

In Figure 4 is shown a modification of the power operator of Figures 1 and 2. As the operation and arrangement of the parts are the same as in Figures 1 and 2, they are designated by the same reference characters, with primes added where the structure is slightly different. The principal difference is that the connections are all made at the end of the piston rod, instead of about the center of it, thus necessitating lengthening some of the passages but shortening the assembly somewhat.

Returning now to Figure 2, the pinion shaft 80 has rotatably sleeved thereon a pair of bevel pinions 180 and 182, of different sizes, meshing respectively with a pair of different sized bevel ring gears 184 and 186. Splined on the pinion shaft 80 are a pair of dog clutches 188 and 190, rigidly connected to be moved in unison by shifter forks 192 and 194, which are rigidly connected for operation by the same vertical lever 196. Shifting this assembly downwardly (rearwardly) interlocks clutch 190 with pinion 182 and gives one speed; shifting it upwardly (forwardly) interlocks clutch 188 with pinion 180 and gives a different speed.

The vertical lever 196 which operates the above-described gear shifting means has its upper end connected to a piston rod 198 operated by a double-acting piston 200 in a cylinder 202 mounted on the top of the gear-box 58. The piston rod 198 is formed with a vacuum passage 204 communicating with a flexible vacuum conduit 206, and with an air passage 208 having an air intake 210 to which a suitable extension, conduit, or air filter may be secured, if desired.

The piston 200 is mounted on a slide valve member 212 sleeved on the piston rod 198 between two abutments shown as provided by snap rings 214 and 216 seated in grooves in the piston rod. The slide valve 212 is formed with ports registrable with openings through the sides of piston rod 198. The ends of the passages 204 and 208 are closed by plugs 218. Springs 220 and 222, clipped to the opposite ends of the cylinder 202, engage the piston 200 and slide valve 212 near the opposite ends of its stroke. This power operator is more fully described and is claimed per se in application No. 580,446, filed December 11, 1931, by Roy S. Sanford and Robert P. Breese.

Figure 5:
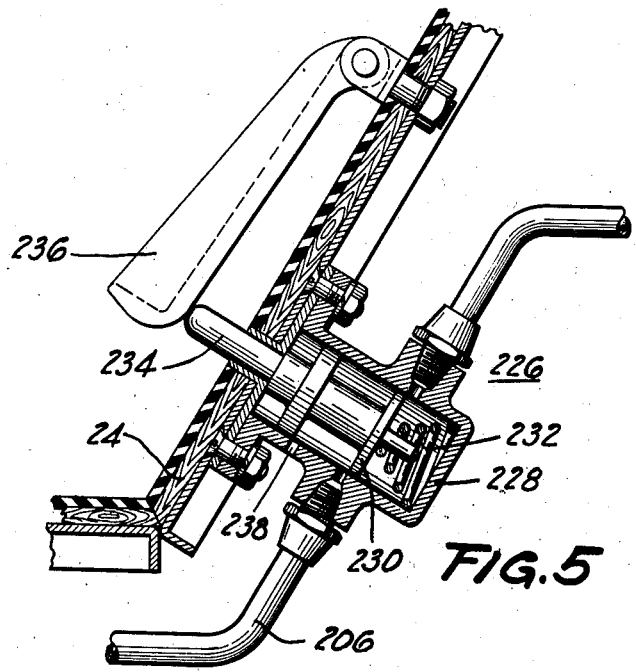
Figure 5 is a vertical section, on a larger scale than the corresponding part of Figure 1, through part of the floorboard and through the control for the high-second gear shift.

The vacuum line 206 is connected to a T-fitting 224 in the clutch control line 50 (to interlock this gear shift also with the clutch control) through a valve 226 shown in detail in Figure 5. This valve includes a valve cylinder 228 bolted to the lower face of the floorboard 24 over an opening therein, and containing a valve piston 230 urged upward by a fairly stiff spring 232, and having a guide plunger 234 extending through the floorboard and engaged by a heel rest or pedal 236 pivotally mounted on the floorboard just below the accelerator pedal 20, in such a position that when the toe of the driver's right foot is on the accelerator pedal his heel is on the rest 236.

Figure 3:
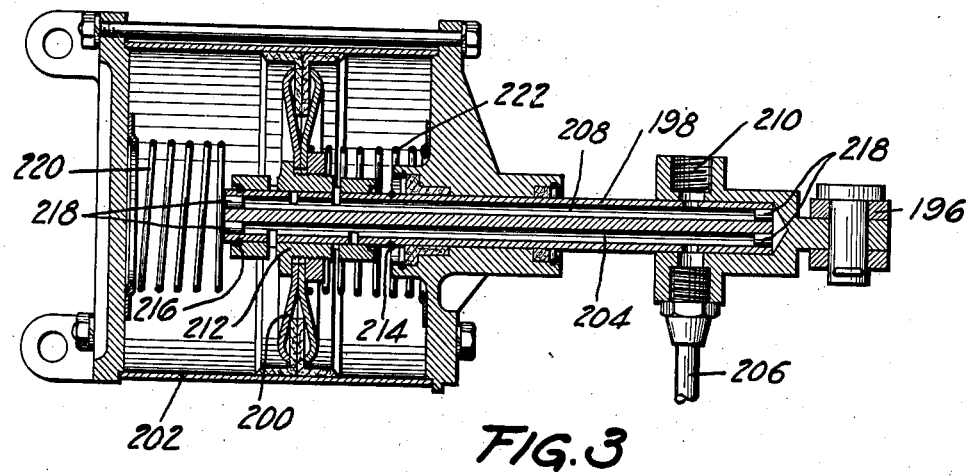
Figure 3 is a horizontal section through the high-second gear shift vacuum unit, this unit being shown in plan in Figure 1 and being located just above the lower right-hand portion of Figure 2.

It will be seen that when the driver lifts the toe of his right foot, thereby throwing out the clutch, he may go on and depress his heel, thereby admitting vacuum to the power device of Figure 3 and shifting from whichever pinion-and-bevel-gear he has been using to the other one and thereby in effect changing gears, or, more accurately, changing speeds, since there is direct drive in both of these speeds.

The above-described power unit piston rod is shown in Figure 3 at the upper and foremost end of its stroke, with pinion 182 driving ring gear 186. If the valve 226 is manipulated as described above (and with the clutch control valve 52 also opened if the devices are interlocked with each other as shown in Figure 1), vacuum enters through conduit 206, passage 204, and the registering ports in the piston rod and the slide valve 212, behind the piston, while the atmosphere communicates with the space ahead of the piston through passage 208 and the registering ports in the piston rod and slide valve ahead of the piston. The piston thereupon moves toward the other extreme of its movement, engaging near the end of its stroke the spring 220, and shifting the clutch 190 out of engagement with pinion 182 and the clutch 188 into engagement with pinion 180, thereby changing speeds.

Now, when the heel is raised and the suction is cut off from conduit 206, air enters through a port 238 (Figure 5) into the space behind piston 200. With the air pressures now balanced on opposite sides of piston 200, spring 220 shifts the slide valve 212 against the abutment 214, ready for the next cycle of operations.

The two ring gears 184 and 186 are bolted or otherwise secured together, and are shown by way of illustration as driving the axle shafts 28 through what is known as a "locking differential". Gear 186 is secured to, or integral with, a central shaft 240 journaled in bearings 242 in the gear-box 58. On one end of shaft 240 is keyed or splined a clutch member 244 having external splines and having clutch sockets or recesses in its outer face. There is a similar clutch member 246 keyed to or formed integrally of the hub part of ring gear 186 opposite the shaft 240.

The clutch members 244 and 246 are encircled by and splined to the external race members 248 of a pair of overrunning roller clutches, the wedge rollers of which are indicated at 250. The inner races 252 of these roller clutches are splined to short drive shafts 254 piloted in opposite ends of shaft 240 and journaled in bearings 256 carried by the gear-box 58, and connected to the axle shafts 28 through suitable universal joints 258 (not shown in detail). There are also, of course, universal joints (not shown) at the outer ends of the axle shafts 28 and through which the axle shafts drive the wheels 26.

It will be seen that, with the parts in the positions just described, the roller clutches 248, 250, 252 act as free-wheel units through which the ring gear 186 (and therefore the engine 10) can drive the wheels, although the wheels cannot drive the engine. In rounding a corner, or when from any other reason the one wheel turns faster than the other, all the power goes to the slower wheel and the faster wheel overruns or "free-wheels". On a down grade or when motor is not driving car, both wheels can overrun or free-wheel.

It is sometimes desirable (for example, when it is desired to use the engine as a brake) to lock out the free-wheel units and provide a positive drive all the way from the engine to the wheels. Accordingly, the free-wheel or roller clutches 248, 250, 252 may be made axially shiftable as units, being splined on the shafts 254 and shifted by a shift member 260 pivoted on the gear-box 58 and a bodily-movable shift member 262 moving in a short slot 264 in the gear-box. These shift members shift the two roller clutches toward each other, when it is desired to lock them out, whereupon clutch projections or pins on the inner ends of the parts 248 interlock in rigid clutching engagement with the clutch recesses on the outer faces of clutch members 244 and 246.

The shift members 260 and 262 are connected to opposite ends of a double-ended piston rod 266, which passes through both ends of a double-ended cylinder 134 and is secured at its center to a piston 268. The left end of cylinder 134 is vented to the atmosphere at 270. An annularly-arranged series of return springs 272 urges the piston 268 to the left, to lock out the free-wheel units.

A vacuum line 136 (Figure 1) is connected to the side of cylinder 134 opposite the air vent 270 and is controlled by a valve 274 of any desired form which connects it directly to the intake manifold 12.

While a separate control may be provided for this valve, if desired, it is shown connected to the hand throttle control rod 22 which, by reason of the lost motion provided, acts successively first to close the valve 274, then to prevent actuation of the clutch control valve 52 by preventing complete release movement of the accelerator pedal, and finally gradually to open the engine throttle valve.

It will be noted that if anything goes wrong with the vacuum connections the free-wheel lock-out described above becomes automatically operative.

Another feature of the invention relates to locating the brakes on the above-described unit, where they form part of the sprung weight, preferably between the free-wheel units 248, 250, 252 and the universal joints 258. As shown, the brake drums 276 are secured to and carried by the shafts 28 just outside the gear-box 58. Suitable internal brakes 278, shown actuated by hydraulic cylinders 280 but which may be of any desired character, are carried by backing plates 282 secured to the opposite sides of the gear-box 58.

In Figure 2, a speedometer drive 284 is shown driven from one of the shafts 254 by suitable gear-and-shaft connections.

While various particular constructions have been described herein in detail, it is not our intention to limit the scope of the invention to those particular constructions, or otherwise than by the terms of the appended claim.

We claim:

Power transmission mechanism for an automotive vehicle provided with two rear wheels, and driving shafts operably connected therewith, means for driving said shafts comprising a one-way clutch unit slidably and drivably connected to each of said driving shafts, a ring gear adapted to be drivably connected to said clutch units, and means for coupling said clutch units with said ring gear.

ROY S. SANFORD.
MONTGOMERY W. McCONKEY.